United States Patent
Terui et al.

(10) Patent No.: US 6,809,513 B2
(45) Date of Patent: Oct. 26, 2004

(54) ROTARY POSITION SENSOR HAVING WATERPROOF, EXPLOSION-PROTECTIVE STRUCTURE

(75) Inventors: Kyuichiro Terui, Miyagi-ken (JP); Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/383,972

(22) Filed: Mar. 7, 2003

(65) Prior Publication Data

US 2003/0173954 A1 Sep. 18, 2003

(30) Foreign Application Priority Data

Mar. 12, 2002 (JP) .................................. 2002-067357

(51) Int. Cl.[7] .............................................. G01B 7/30
(52) U.S. Cl. ................. 324/207.25; 324/252; 324/259; 123/612; 123/617
(58) Field of Search ...................... 324/207.13, 207.2, 324/207.21, 207.22, 235, 244, 252, 259, 207.25; 73/514.01, 514.02, 514.16, 514.31, 514.35, 514.39; 123/612, 617

(56) References Cited

U.S. PATENT DOCUMENTS 4,646,011 A 2/1987 Wallrafen 5,889,400 A 3/1999 Nakazawa

FOREIGN PATENT DOCUMENTS

| EP | 0 482 380 A2 | 4/1999 |
| JP | 11-153404 | 6/1999 |
| WO | WO01/77622 A2 | 10/2001 |

OTHER PUBLICATIONS

Patent Abstracts of Japan, Publication No. 11153404, Published on Jun. 8, 1999.

*Primary Examiner*—Bot LeDynh
(74) *Attorney, Agent, or Firm*—Beyer, Weaver & Thomas LLP

(57) ABSTRACT

A rotary position sensor includes a cylindrical housing having a partition wall which divides the interior of the housing into a first storing space and a second storing space. The first storing space stores a rotating mechanism and is closed with a first cover in such a manner that a shaft portion of a rotating member projects outside, and the second storing space stores an electrical circuit component and is closed with a second cover. A magnet included in the rotating mechanism is disposed at a position close to the partition wall, and a giant magnetoresistive element included in the electrical circuit component is disposed in a recess formed in the partition wall. Thus, the rotating mechanism and the electrical circuit component are completely separated from each other by the partition wall, so that a complex sealing process is not necessary and the detection accuracy can be increased.

5 Claims, 3 Drawing Sheets

ROTARY POSITION SENSOR HAVING WATERPROOF, EXPLOSION-PROTECTIVE STRUCTURE

BACKGROUND OF THE INVENTION

1. Field of the Invention

The present invention relates to rotary position sensors used for detecting rotation angles of various devices or for detecting the amount of depression of a pedal, such as an accelerator pedal, on the basis of a rotation angle of a rotating member which moves in conjunction with the pedal. More specifically, the present invention relates to a magnetic rotary position sensor which requires a waterproof, explosion-protective structure for an electrical circuit component installed therein.

2. Description of the Related Art

In a typical magnetic rotary position sensor, a magnet is attached to a rotating member, and a magnetic field of the magnet is applied to a magnetoelectric transducer. The magnetoelectric transducer detects the magnetic field of the magnet which changes in accordance with the rotation of the magnet, and the sensor outputs an electrical signal representing the rotation angle of the rotating member. Thus, it is not necessary to store an electrical circuit component which is constructed by mounting electronic parts, such as the magnetoelectric transducer, on a circuit board and a rotating mechanism which is rotated by a detection object in the same space. Therefore, a structure for protecting the electrical circuit component from external water and combustible gas can be obtained relatively easily.

More specifically, it is not easy and involves high costs to completely seal the rotating mechanism, which is mechanically connected to the detection object, and it is difficult to maintain the reliability of the seal for a long time. Accordingly, in optical and resistive sensors, in which the space for storing the rotating mechanism and the space for storing the electrical circuit component must be continuous to each other, it is not practicable to obtain a waterproof, explosion-protective structure for the electrical circuit component with low cost or to maintain the reliability of the waterproof, explosion-protective structure. On the contrary, in magnetic sensors, the detection accuracy is not affected even when the space for storing the rotating mechanism and the space for storing the electrical circuit component are not continuous to each other, and only the electrical circuit component, for which the waterproof and explosion-protective structure is necessary, must be sealed. Thus, magnetic sensors are advantageous in view of reliability improvement and cost reduction.

With respect to such magnetic rotary position sensors, a sensor in which a seal block which contains the electrical circuit component and which is sealed with resin is combined with the rotating mechanism and a housing has been proposed. In such a known sensor, the seal block is constructed in advance as an electrical circuit component unit having a waterproof, explosion-protective structure, and the housing in which the rotating mechanism including the magnet is rotatably retained is attached to the seal block. Therefore, even when external water or combustible gas enters the rotating mechanism, the electrical circuit component enclosed in the seal block can be reliably protected.

In the above-described known rotary position sensor, it is not technically difficult to form the seal block which encloses the electrical circuit component. However, since a resin block, which defines the size of the seal block, must completely surround the electrical circuit component and be provided with an engaging member for being engaged with the housing on the exterior of the resin block, there is a limit to the reduction in the overall size, including thickness. Accordingly, a large amount of resin must be used and a complicated forming process must be performed for obtaining the seal block. In addition, the product assembly process cannot be performed until a complicated sealing process is completed. Therefore, the above-described known sensor has problems in that it cannot be manufactured with sufficient yield and the cost of the product increases.

SUMMARY OF THE INVENTION

In view of the above-described situation, an object of the present invention is to provide a magnetic rotary position sensor in which a waterproof, explosion-protective structure for an electrical circuit component can be easily established and which can be manufactured with high yield and at low cost.

In order to attain the above-described object, a rotary position sensor according to the present invention includes a cylindrical housing having a partition wall in the interior thereof; a rotating member which is stored in a space between a first open end of the housing and the partition wall in such a manner that the rotating member can rotate; a magnet which is provided on the rotating member at a position close to the partition wall and which generates a magnetic field which extends beyond the partition wall toward a second open end of the housing; a first cover which closes the first open end in such a manner that a shaft portion of the rotating member projects outward from the housing; an electrical circuit component which includes a magnetoelectric transducer and which is stored in a space between the second open end of the housing and the partition wall in such a manner that the magnetoelectric transducer is placed at a position close to the partition wall; and a second cover which closes the second open end so as to seal the electrical circuit component. The magnetic field of the magnet which is applied to the magnetoelectric transducer changes in accordance with the rotation of the rotating member, and the electrical circuit component outputs an electrical signal corresponding to a rotation angle of the rotating member.

In the rotary position sensor which is constructed as described above, since the interior of the housing is divided into two spaces by the partition wall, a rotating mechanism (the rotating member, the magnet, etc.) and the electrical circuit component can be stored in different spaces and be completely separated from each other by the partition wall. Therefore, a waterproof, explosion-protective structure for the electrical circuit component can be easily established by simply sealing a gap between the second cover and the housing with a small amount of resin, an O-ring, etc., and it is not necessary to perform a complex sealing process. In addition, since the rotating mechanism and the electrical circuit component can be installed in different spaces without causing them to interfere with each other, an assembly process can be easily performed and the yield can be easily increased. Accordingly, an inexpensive magnetic rotary position sensor having high reliability can be provided.

Preferably, the partition wall of the housing is provided with a support member receiver which supports the rotating member in such a manner that the rotating member can rotate, so that the number of components can be reduced and the overall thickness can also be reduced. In this case, preferably, magnetic poles of the magnet may be arranged such that opposite poles face each other across a rotational center of the rotating member; a support projection is provided on the bottom surface of the rotating member at the rotational center of the rotating member, the support projection being in contact with the support member receiver and being pivotally supported by the support member receiver; and the magnetoelectric transducer is a giant magnetoresistive (GMR) element which is disposed at a position such that the giant magnetoresistive element faces the support projection across the partition wall. In this case, the rotating member is pivotally supported by the support member receiver with the support projection therebetween, so that even when lateral pressure is applied, the rotating member can be prevented from being displaced in the lateral direction and only tilts around a pivot center. Even when the rotating member tilts, the magnetic field detected by the giant magnetoresistive element is affected only slightly. Accordingly, the rotation angle of the rotating member can be detected by the giant magnetoresistive element with high accuracy even when lateral pressure is applied, and the detection accuracy can be improved.

In addition, when the support projection is composed of a metal and the support member receiver is composed of a resin, abrasion of the support projection can be prevented and an end portion of the support projection can be substantially in point contact with the support member receiver for a long time. Accordingly, the pivot center of the rotating member can be stably maintained at the same position. In addition, preferably, the partition wall projects toward the first open end so that a recess is provided as viewed from the second open end, and the giant magnetoresistive element is disposed in the recess. In such a case, the giant magnetoresistive element can be easily positioned in a region where the magnetic force is strong and the detection accuracy can be further improved.

DESCRIPTION OF THE PREFERRED EMBODIMENTS

Figure 1:
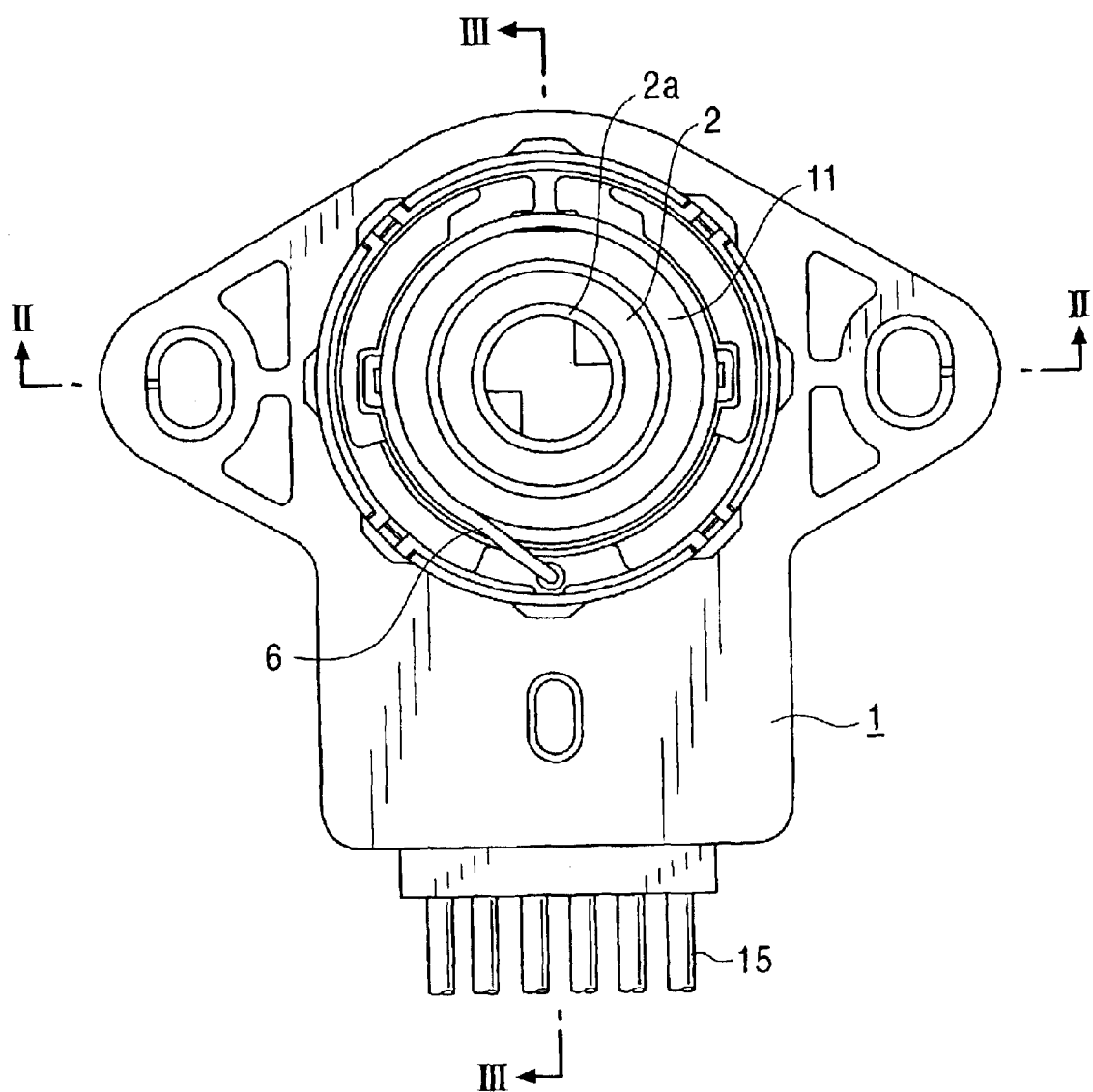
FIG. 1 is a plan view of a rotary position sensor according to an embodiment of the present invention.
Figure 2:
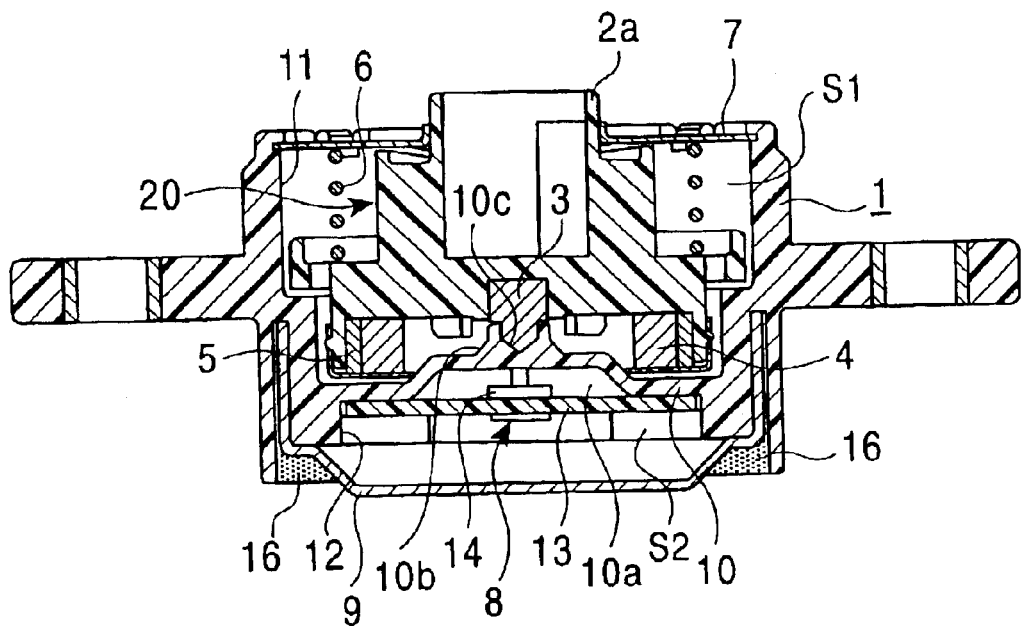
FIG. 2 is a sectional view of the sensor shown in FIG. 1 cut along line II—II.
Figure 3:
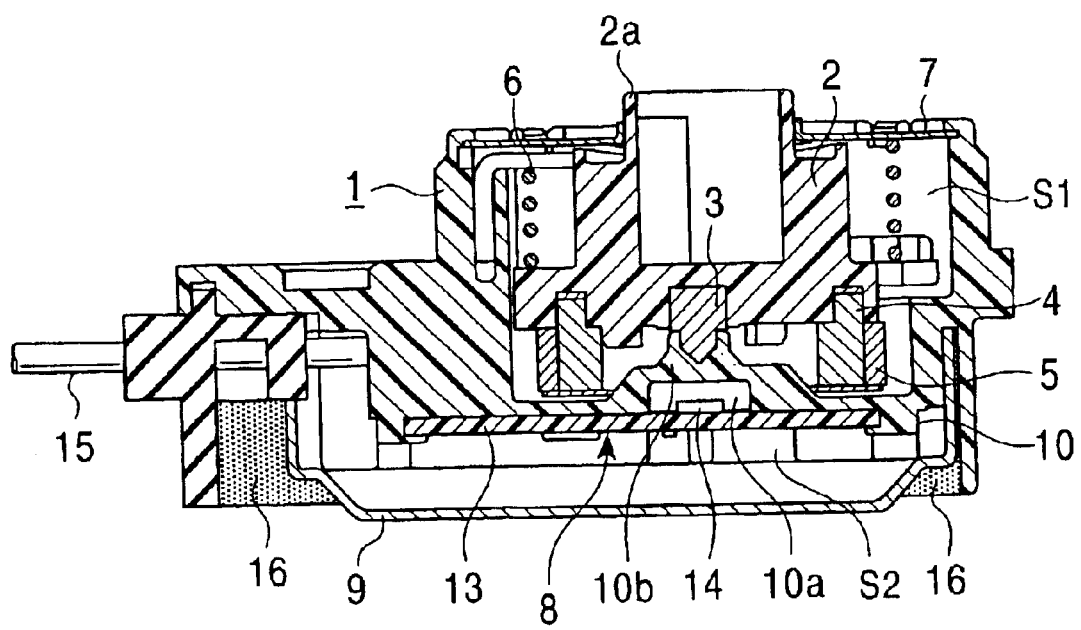
FIG. 3 is a sectional view of the sensor shown in FIG. 1 cut along line III—III.
Figure 4:
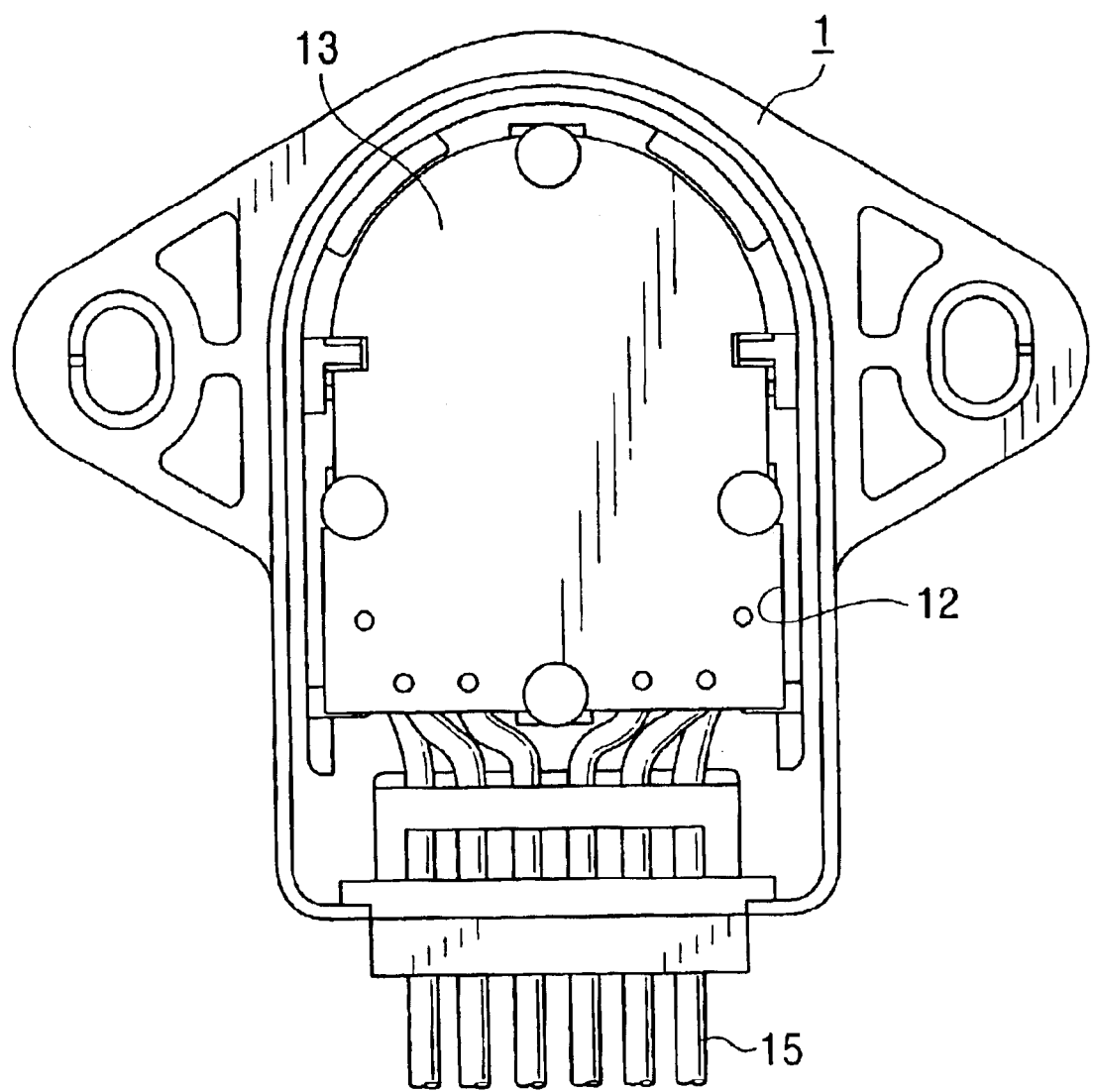
FIG. 4 is a bottom view of the sensor.

An embodiment of the present invention will be described below with reference to the accompanying drawings. FIG. 1 is a plan view of a rotary position sensor according to the present embodiment where a part of the sensor is omitted, FIG. 2 is a sectional view of the sensor shown in FIG. 1 cut along line II—II, FIG. 3 is a sectional view of the sensor shown in FIG. 1 cut along line III—III, and FIG. 4 is a bottom view of the sensor where a part of the sensor is omitted. In FIGS. 1 and 4, covers are omitted in order to show the interior of the sensor.

The rotary position sensor shown in FIGS. 1 to 4 detects the amount of depression of a pedal, such as an acceleration pedal and a brake pedal of a vehicle, on the basis of a rotation angle of a rotating member which moves in conjunction with the pedal. The rotary position sensor includes a cylindrical housing 1 which is composed of resin and which has a partition wall 10 in the interior thereof; a rotating member 2 which is composed of resin and which is disposed in a storing space S1 between an open end 11 at one end of the housing 1 and the partition wall 10; a support projection 3 which is composed of metal and which is press fitted into the bottom portion of the rotating member 2 at the rotational center of the rotating member 2; a ring-shaped magnet 4 which is fixed on the bottom surface of the rotating member 2 at the peripheral region thereof such that the magnet 4 is in the vicinity of the partition wall 10; a back yoke 5 which is fixed to the rotating member 2 at a position such that the back yoke 5 surrounds the magnet 4 and which serves to prevent leakage of magnetic flux generated by the magnet 4; a return spring 6 which is fixed to the housing 1 at one end thereof and to the rotating member 2 at the other end thereof; a first cover 7 which is constructed of a metal plate and which closes the open end 11 in such a manner that a shaft portion 2a of the rotating member 2 projects outward from the housing 1; an electrical circuit component 8 which is disposed in a storing space S2 between an open end 12 at the other end of the housing 1 and the partition wall 10; and a second cover 9 which is constructed of a metal plate and which closes the open end 12 so as to seal the electrical circuit component 8 inside the storing space S2.

A rotating mechanism 20 is constructed of the rotating member 2, the support projection 3, the magnet 4, and the back yoke 5, which are integrated with each other, and is disposed in the storing space S1 of the housing 1 in a rotatable manner. Although not shown in the figures, the shaft portion 2a of the rotating member 2 is connected to a pedal, which is a detection object, with a wire or the like. The electrical circuit component 8 is constructed by mounting various electronic parts, including a giant magnetoresistive element 14 which serves as a magnetoelectric transducer for detecting a change in the magnetic field of the magnet 4, on a circuit board 13 which is fixed to the housing 1 in the storing space S2. A signal output from the electrical circuit component 8 is transmitted to an external device (not shown) via a cable 15. A gap between the housing 1 and the second cover 9 which closes the open end 12 is sealed by filling the gap with a resin 16 and curing it.

As shown in FIGS. 2 and 3, the partition wall 10, which divides the interior of the housing 1 into the storing space S1 and the storing space S2, projects toward the open end 11 so that a recess 10a is provided as viewed from the open end 12. In addition, the partition wall 10 has a support member receiver 10b at the central region thereof, and the support member receiver 10b receives the support projection 3 and thereby supports the rotating member 2 in a rotatable manner. An insertion hole 10c having approximately the same shape as that of an end portion of the support projection 3 is formed in the support member receiver 10b at the side facing the storing space S1. The end portion of the support projection 3 is inserted into the insertion hole 10c and a pointed end of a conical portion of the support projection 3 is brought into contact with the support member receiver 10b at the central position thereof, whereby the support projection 3 is supported in a pivotable manner. More specifically, the rotating member 2 is rotatably retained in the housing 1 in a state such that it is pivotally supported by the central portion (support member receiver 10b) of the partition wall 10 with the support projection 3 therebetween. In the ring-shaped magnet 4, magnetic poles are arranged such that opposite poles face each other across the rotational center of the rotating member 2. Accordingly, the support projection 3 is always placed at the central position between an N-pole and an S-pole of the magnet 4. In addition, the giant magnetoresistive element 14 included in the electrical circuit component 8 is disposed in the recess 10a, which is formed in the partition wall 10 at the side facing the storing space S2, at a position such that the giant magnetoresistive element 14 faces the support projection 3 across the partition wall 10. Accordingly, the giant magnetoresistive element 14 is placed in a region where the magnetic force applied by the magnet 4 is strong.

In the rotary position sensor which is constructed as described above, when the rotating member 2 is rotated by a predetermined amount in accordance with the movement of the pedal, which is the detection object, the magnetic field of the magnet 4 which is applied to the giant magnetoresistive element 14 changes in accordance with the rotation of the rotating member 2. Accordingly, the output signal from the electrical circuit component 8 changes, so that the amount of depression of the pedal can be determined on the basis of the change in the output signal. When the rotational driving force of the pedal is removed from the rotating member 2, the rotating member 2 rotates in the reverse direction and returns to the original position due to an elastic restoring force of the return spring 6.

In the above-described rotary position sensor, the interior of the housing 1 is divided into the storing space S1 and the storing space S2 by the partition wall 10. The electrical circuit component 8 including the circuit board 13, etc., is disposed in the storing space S2, which is completely separated from the storing space S1 in which the rotating mechanism 20 including the rotating member 2, etc., is disposed. Accordingly, the electrical circuit component 8 can be reliably protected from external water and combustible gas by simply sealing the gap between the second cover 9 and the housing 1 with a small amount of resin 16, and a complex sealing process which is necessary for manufacturing the above-described known sensor can be omitted. In addition, since the rotating mechanism 20 and the return spring 6 disposed in the storing space S1 do not interfere with the electrical circuit component 8 disposed in the storing space S2, the assembly process can be performed easily. Thus, the yield can be increased and the costs can be reduced.

In addition, in the above-described rotary position sensor, the support member receiver 10b which receives the support projection 3 and thereby supports the rotating member 2 in a rotatable manner is formed at the central position of the partition wall 10. Thus, it is not necessary to attach a separate component as the support member receiver, so that the number of components can be reduced and the thickness of the housing 1 can be easily reduced. In addition, since a supporting structure in which the support projection 3 is pivotally supported by the support member receiver 10b is applied, even when lateral pressure is applied externally, the rotating member 2 can be prevented from being displaced in the lateral direction and only tilts around a pivot center. Even when the rotating member 2 tilts, the magnetic field detected by the giant magnetoresistive element 14, which is positioned directly below the pivot center, is affected only slightly. In addition, since the giant magnetoresistive element 14 is disposed in the recess 10a of the partition wall 10 in a region where the magnetic force applied by the magnet 4 is strong, the detection accuracy can be increased. Accordingly, in the above-described rotary position sensor, the rotation angle of the rotating member 2 can always be detected with high accuracy by the giant magnetoresistive element 14 while preventing the rotating member 2 from being displaced in the lateral direction in the detection process.

When the supporting structure in which the support projection 3 composed of metal is in contact with the support member receiver 10b composed of resin is applied as in the present embodiment, abrasion of the support projection 3 can be prevented and the end portion of the support projection 3 can be substantially in point contact with the support member receiver 10b for a long time. Accordingly, the reliability of preventing the displacement of the pivot center of the rotating member 2 can be maintained. This effect can also be obtained by a supporting structure in which a projecting member which is composed of metal and which projects toward the storing space S1 is provided on the partition wall 10 at the central region thereof and a pointed end of the projecting member is inserted into a conical hole which is formed in the bottom surface of the rotating mechanism 20 at the rotational center thereof.

Although the gap between the second cover 9 and the housing 1 is sealed with the resin 16 in the present embodiment, the gap can also be sealed with an O-ring. In such a case, the sealing process can be omitted, so that the yield can be further increased.

What is claimed is:

1. A rotary position sensor comprising:

a cylindrical housing having a partition wall in the interior thereof;

a rotating member which is stored in a space between a first open end of the housing and the partition wall in such a manner that the rotating member can rotate;

a magnet which is provided an the rotating member at a position close to the partition wall and which generates a magnetic field which extends beyond the partition wall toward a second open end of the housing;

a first cover which closes the first open end in such a manner that a shaft portion of the rotating member projects outward from the housing;

an electrical circuit component which includes a magnetoelectric transducer and which is stored in a space between the second open end of the housing and the partition wall in such a manner that the magnetoelectric transducer is placed at a position close to the partition wall; and a second cover which closes to second open end so as to seal the electrical circuit component, wherein the magnetic field of the magnet which is applied to the magnetoelectric transducer changes in accordance with the rotation of the rotating member, and the electrical circuit component outputs an electrical signal corresponding to a rotation angle of the rotating member, and wherein the partition wall of the housing is provided with a support member receiver which supports the rotating member in such a manner that the rotating member can rotate.

2. A rotary position sensor according to claim 1, wherein magnetic poles of the magnet are arranged such that opposite poles face each other across a rotational center of the rotating member, wherein a support projection is provided on the bottom surface of the rotating member at the rotational center of the rotating member, the support projection being in contact with the support member receiver and being pivotally supported by the support member receiver, and wherein the magnetoelectric transducer is a giant magnetoresistive element which is disposed at a position such that the giant magnetoresistive element faces the support projection across the partition wall.

3. A rotary position sensor according to claim 2, wherein the support projection is composed of a metal and the support member receiver is composed of a resin.

4. A rotary position sensor according to claim 2, wherein the partition wall projects toward the first open end so that a recess is provided as viewed from the second open end, and the giant magnetoresistive element is disposed in the recess.

5. A rotary position sensor comprising:
- a cylindrical housing including a partition wall portion, the cylindrical housing having first and second open ends;
- a rotating member provided in a space between the first open end and the partition wall portion;
- a magnet which generates, a magnetic field;
- a first cover which closes the first open end in much a manner that a shaft portion of the rotating member projects outward from the cylindrical housing;
- a magnetoelectric transducer provided in a space between the second open end and the partition wall portion, the magnetoelectric transducer being capable of detecting changes in the magnetic field corresponding to rotation of the rotating member; and
- a second cover which closes the second open end so as to seal the magnetoelectric transducer;

wherein the partition wall portion is capable of rotatably support the rotating member.

* * * * *